F. S. FIELDS.
LAWN EDGING IMPLEMENT.
APPLICATION FILED AUG. 27, 1912.
1,060,445.
Patented Apr. 29, 1913.
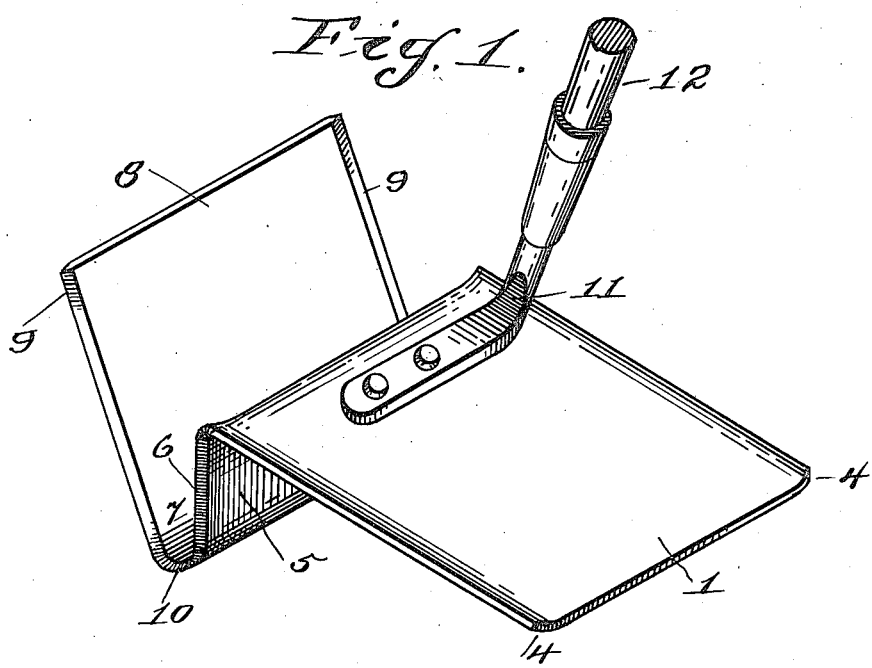
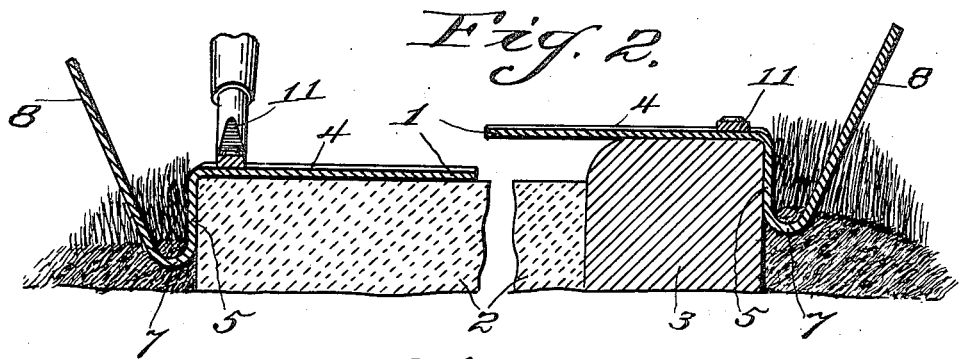
WITNESSES
Wm Evalt Jr.
C. T. Bell
INVENTOR
Frank S. Fields,
By W. H. Wills, Attorney.

UNITED STATES PATENT OFFICE.

FRANK S. FIELDS, OF PORTLAND, OREGON.

LAWN-EDGING IMPLEMENT.

1,060,445. Specification of Letters Patent. Patented Apr. 29, 1913.

Application filed August 27, 1912. Serial No. 717,315.

*To all whom it may concern:*

Be it known that I, FRANK S. FIELDS, a citizen of the United States, residing at Portland, in the county of Multnomah and State of Oregon, have invented certain new and useful Improvements in Lawn-Edging Implements, of which the following is a specification.

This invention relates to lawn edgers, and pertains especially to a hand implement for trimming the grass and sod adjacent to side walks, curbs and coping.

The object of the invention is to provide a hand tool or implement of such novel and peculiar shape as to be readily applied to the edge of side walks, curbing and coping, and of such construction as to afford a plurality of cutting edges at different angles to each other so as to form a groove adjacent the walk, curbing or coping during the cutting operation.

A still further object of the invention is to provide a lawn edging implement having such arrangement of knife edges as to afford means for cutting the grass and sod during the forward and backward movement of the implement, and to provide the cutter with a rest plate or guide flange of novel and peculiar shape and construction.

In the accompanying drawings forming part of this application: Figure 1— is a perspective view with the handle partly broken away. Fig. 2— is a sectional view showing the application of the implement to a side walk and a coping. Fig. 3— is a longitudinal section of the two cutting blades.

The same reference characters denote the same parts throughout the several views of the drawings.

The subject of this invention comprises a one-piece implement composed of sheet or plate steel capable of being worked or shaped into a plurality of cutting edges adapted for proper tempering. The sheet forms a guide rest 1, for engaging the surface of a pavement or side walk 2, or making a like engagement with a curb or coping 3. The side edges of the rest 1 are curved upwardly at 4, so as to permit the rest 1 to slide in pushing and pulling the implement, without scraping the element upon which it is slid, and to produce expeditious sliding and tilting movement. The sheet is bent downwardly at right angles to the rest 1, to form a vertically disposed blade 5, each end of which has a cutting edge 6. A grooving portion 7 is formed at the bottom of the blade 5 by bending the sheet upwardly and outwardly from the blade 5, and said outward and upward portion extends above the top of the blade 5, so as to form an inclined fender wing 8 having cutting edges 9, and each end of the grooving portion 7 has a cutting edge 10. The said wing being straight so as to present flat surfaces. A stock 11 is secured to the rest-plate 1, for attaching a handle 12.

It will be understood that in operating the implement it is successively or repeatedly inserted and removed under a pulling or pushing and pulling manipulation and thereby cut out and remove the sod and grass adjacent to a curbing or coping, so as to leave a furrow in the sod and an interval or space between the grass and the curb or coping. The inner side of the coping or curb and the furrow may be cleaned by a continuous sliding movement of the implement, and during this as well as the first mentioned operations, the blade 8 acts as a fender for the uncut grass, and owing to the inclined or angular position of this fender blade the top of the grass is pressed back from the furrow.

The gutter, groove or furrow is made perfectly uniform as to depth and width and it is made perfectly parallel with curb, coping or other elements against which the vertical blade and rest are operated.

It is obvious that the size and material of the implement may be varied as desired or as occasion may demand without departing from the spirit of the invention as set up in the appended claim.

Having thus described my invention what I claim as new and desire to secure by Letters Patent is:—

A reversible lawn edger composed of a single sheet of metal of uniform width and comprising a vertical section having a cutting edge at each end thereof, a straight flat-faced wing extending from the bottom of said section at an angle thereto and terminating in a straight edge above the top of said section and having side cutting edges, a flat rest-plate extending from the top of said section at right angles thereto and having upturned side edges merging into the cutting edges of the said section, and a handle stock secured to the said plate between the upturned edges and adjacent to the top of said section, substantially as shown and described.

In witness whereof I hereunto set my hand in the presence of two witnesses.

FRANK S. FIELDS.

Witnesses:
 ALLAN C. PEEL,
 JAMES S. McCORD.